United States Patent
Niimi et al.

(10) Patent No.: US 6,367,270 B2
(45) Date of Patent: Apr. 9, 2002

(54) VEHICLE AIR-CONDITIONING SYSTEM

(75) Inventors: Yasuhiko Niimi, Handa; Toshinobu Homan, Obu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/746,626

(22) Filed: Dec. 21, 2000

(30) Foreign Application Priority Data

Dec. 22, 1999 (JP) .......................................... 11-365034

(51) Int. Cl.⁷ ................................................. B60H 1/32
(52) U.S. Cl. ............................. 62/133; 62/180; 62/182; 62/236; 62/243; 62/230; 62/228.5
(58) Field of Search ................................. 62/133, 176.1, 62/176.2, 176.3, 180, 182, 186, 228.1, 228.3, 228.4, 228.5, 243, 244, 236, 323.1, 323.3, 323.4, 407, 408, 230

(56) References Cited

U.S. PATENT DOCUMENTS 5,867,996 A * 2/1999 Takano et al. ............ 62/236 X
6,230,507 B1 * 5/2001 Ban et al. ............... 62/228.5 X
6,287,081 B1 * 9/2001 Tamegai et al. .......... 62/133 X

FOREIGN PATENT DOCUMENTS

| JP | U-60-155724 | 10/1985 |
| JP | U-6-87678 | 12/1994 |
| JP | A-11-254955 | 9/1999 |

* cited by examiner

Primary Examiner—Harry B. Tanner
(74) Attorney, Agent, or Firm—Harness, Dickey & Pierce, PLC

(57) ABSTRACT

The present invention balances power consumption reduction and a cooling in a vehicle air-conditioning system having a compressor selectively driven by a vehicle engine or a motor while the compressor is driven by the motor. At least one of a capacity of a blower and a capacity of a compressor arranged in a refrigeration cycle R while the compressor being driven by a motor is reduced in comparison to the capacity of the blower and the capacity of the compressor while the compressor being driven by a vehicle engine. Furthermore, while a cooling heat load of an evaporator is greater than a predetermined value, the capacity of the compressor is first reduced prior to reducing the capacity of the blower.

23 Claims, 9 Drawing Sheets

1: COMPRESSOR
5: EVAPORATOR
20: VEHICLE ENGINE
21: MOTOR

VEHICLE AIR-CONDITIONING SYSTEM

CROSS-REFERENCE TO RELATED APPLICATION

The present invention is related to Japanese patent application No. Hei. 11-365034, filed Dec. 22, 1999; the contents of which are incorporated herein by reference.

FIELD OF THE INVENTION

The present invention relates to a control mechanism for reducing electric power consumption of a vehicle air-conditioning system, and more particularly, to a control mechanism for reducing electric power consumption of a vehicle air-conditioning system having an air-conditioning compressor selectively driven by a vehicle engine or a motor while the air-conditioning compressor is driven by the motor.

BACKGROUND OF THE INVENTION

In a typical prior art vehicle air-conditioning system, a compressor is driven by a drive force transmitted from a vehicle engine via a belt to circulate a refrigerant within a refrigeration cycle. Thus, in a vehicle (eco-run car) that has the compressor driven by the described drive mechanism and also has a feature to automatically stall the engine while the vehicle is not running to protect the surrounding environment from the engine emissions, the compressor stops when the engine is stalled, resulting in stopping of the air-conditioning.

This fact constitutes one reason for preventing wide spread use of the eco-run cars. To address this disadvantage, Japanese Unexamined Utility Model Publication No. 60-155724 and No. 6-87678 discloses use of a motor for driving the compressor while the vehicle is not running. The motor is powered from a battery that is charged by a generator. The generator is driven by the engine while the vehicle is running.

In the prior art disclosed in the above publication, since the compressor is driven by the motor while the vehicle is not running (while the engine is not operated), a large capacity battery is required for supplying enough electric power to the motor.

If the large capacity battery is not provided, the engine must be restarted within a short period of time after the engine stall in order to prevent excessive discharge of the battery due to the power consumption of the motor during the non-running period of the vehicle. This fact deteriorates an advantageous fuel saving feature of the eco-run car.

SUMMARY OF THE INVENTION

It is therefore an objective of the present invention to reduce the power consumption of a vehicle air-conditioning system having a compressor selectively driven by a vehicle engine or a motor while the compressor is driven by the motor.

Another object of the present invention is to achieve a good balance between the power consumption reduction and a feeling of coolness in a vehicle air-conditioning system having a compressor selectively driven by a vehicle engine or a motor while the compressor is driven by the motor.

Another object of the present invention is to achieve a good balance between the power consumption reduction and anti-fogging performance in a vehicle air-conditioning system having a compressor selectively driven by a vehicle engine or a motor while the compressor is driven by the motor.

A further object of the present invention is to appropriately reduce the power consumption based on the amount of remaining charge in a battery in a vehicle air-conditioning system having a compressor selectively driven by a vehicle engine or a motor while the compressor is driven by the motor.

In a first aspect of the invention, to achieve the above objectives, a capacity of a blower and a capacity of a compressor are arranged in a refrigeration cycle while the compressor being driven by a motor is reduced in comparison to the capacity of the blower and the capacity of the compressor while the compressor is driven by a vehicle engine. Furthermore, while a cooling heat load of an evaporator is greater than a predetermined value, the capacity of the compressor is first reduced prior to reducing the capacity of the blower.

The capacity of the blower can be indicated by the amount of the air flow per unit time. The capacity of the compressor can be indicated by the amount of the refrigerant discharged from the compressor per unit time. When a variable displacement compressor is used as the compressor of the present invention, the capacity of the variable displacement compressor can be changed by adjusting a displacement of the variable displacement compressor. When a fixed displacement compressor is used as the compressor of the present invention, a capacity of the fixed displacement compressor can be changed by adjusting a ratio between an "ON" period and an "OFF" period (utilization rate) of the fixed displacement compressor. Furthermore, when the compressor is driven by the motor, the capacity of the compressor can be changed by controlling a rotation speed of the motor. Either the capacity of the blower or the capacity of the compressor while the compressor is driven by the motor is reduced.

Furthermore, while the cooling heat load of the evaporator is greater than the predetermined value, the capacity of the compressor is first reduced prior to reducing the capacity of the blower. Thus, when the cooling heat load of the evaporator is high, for example, when the outside air temperature is high during the summer, the power saving can be achieved by reducing the capacity of the compressor while maintaining the large capacity of the blower.

When the cooling heat load of the evaporator is high, rather than providing a lower temperature of the cool air blown out from the air-conditioning system, the higher air flow rate of the cool air should be provided to maintain the feeling of coolness.

In another aspect of the invention, at least the capacity of the blower or the capacity of the compressor while the compressor being driven by the motor is reduced in comparison to the capacity of the blower and the capacity of the compressor while the compressor being driven by the vehicle engine. Furthermore, while the compressor is driven by the motor, if the window glass of the vehicle is under a fog inducing condition, the capacity of the blower is first reduced prior to reducing the capacity of the compressor.

Furthermore, while the window glass of the vehicle is under the fog inducing condition, the capacity of the blower is first reduced prior to reducing the capacity of the compressor, so that, for example, under the low outside air temperature condition during the winter, power saving can be achieved by reducing the capacity of the blower while maintaining the large capacity of the compressor. As a result, the high dehumidifying capacity of the evaporator is maintained, and therefore the high anti-fogging performance of the air-conditioning system for preventing fogging of the vehicle window can be adequately provided.

In another aspect of the invention, while a blow mode is set to provide directional air toward the window glass of the vehicle, the capacity of the blower is not reduced even if it is determined that the window glass of the vehicle is under the fog inducing condition.

While the blow mode is set to providing directional air toward the window glass of the vehicle, the capacity of the blower is not reduced, so that the anti-fogging performance can be maximized at the sacrifice of power saving. As a result, fogging of the window glass of the vehicle can be cleared within a short period of time even while the compressor is driven by the motor (i.e., even while the engine is not operated).

In another aspect of the invention, there is provided means for changing the capacity of the compressor in a gradual manner. A rate of gradual change of the capacity of the compressor while the compressor being driven by the motor is set to be higher than that of the compressor while the compressor being driven by the vehicle engine.

With this arrangement, when the capacity of the compressor is reduced while the compressor is driven by the motor, the capacity of the compressor can be quickly reduced to improve the power saving.

In another aspect, the capacity of the compressor is adjusted to make an actual degree of coolness of the evaporator to coincide with a target value. A rate of change of the target value while the compressor being driven by the motor is increased in comparison to the rate of change of the target value while the compressor being driven by the vehicle engine, so that the rate of the gradual change of the capacity of the compressor can be increased.

Since the rate of change of the target value while the compressor being driven by the motor is increased, the capacity of the compressor can be reduced quickly to improve power saving.

In another aspect of the invention, the compressor is a variable displacement compressor, and the capacity of the compressor is changed by changing the displacement of the variable displacement compressor. With this arrangement, the capacity of the variable displacement compressor can be reduced quickly to improve the power saving.

In another aspect of the invention, a computing means is provided for computing a control output value, which determines the displacement of the compressor, based on a deviation between the actual degree of coolness of the evaporator and the target value. A rate of change of the control output value computed by the computing means relative to the deviation while the compressor being driven by the motor is increased in comparison to the rate of change of the control output value computed by the computing means relative to the deviation while the compressor being driven by the vehicle engine.

With this arrangement, when the control output value for controlling the displacement of the compressor is computed, the rate of change of the control output value is increased while the compressor is driven by the motor. As a result, the rate of gradual—change in the displacement control can be increased to improve the power saving.

In another aspect, there is provided means for gradually changing the capacity of the blower for blowing the air toward the interior of the vehicle. A rate of gradual change of the capacity of the blower while the compressor being driven by the motor is increased in comparison to the rate of gradual change of the capacity of the blower while the compressor being driven by the vehicle engine.

In another aspect of the invention, the capacity of the blower or the capacity of the compressor arranged in the refrigeration cycle while the compressor being driven by the motor is reduced in comparison to the capacity of the blower and the capacity of the compressor while the compressor being driven by the vehicle engine. Furthermore, while the compressor is driven by the motor, at least one of a degree of the reduction of the capacity of the blower and a degree of the reduction of the capacity of the compressor is controlled based on the amount of remaining charge in a battery that provides power to the motor.

With this arrangement, the degree of the reduction of the capacity of the blower and/or the degree of the reduction of the capacity of the compressor can be adjusted to an appropriate level corresponding with the amount of the remaining charge in the battery while the compressor is driven by the motor.

Therefore, large power consumption that depletes the remaining charge in the battery within a short period of time can be predicted. If large power consumption is predicted, the amount of reduction of the capacity of the blower and the reduction of the capacity of the compressor can be increased to reduce the power consumption. As a result, large power consumption while the compressor being driven by the motor can be prevented to avoid restart of the engine shortly after the engine is stalled.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

Figure 1:
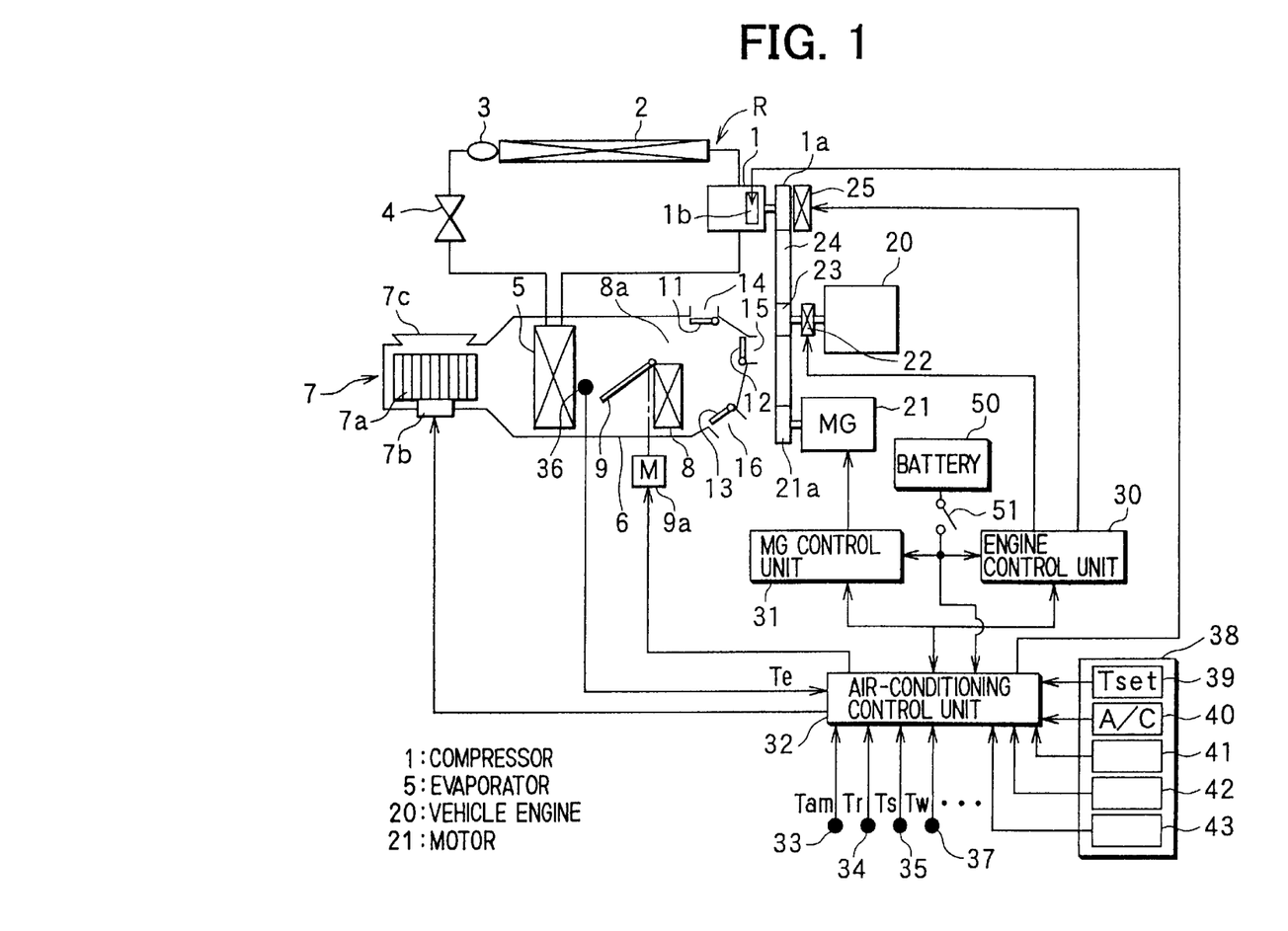
FIG. 1 is a schematic diagram showing a first embodiment of the present invention.

FIG. 1 shows a vehicle air-conditioning system according to a first embodiment of the present invention. Here, a refrigeration cycle R for air-conditioning includes a compressor 1, a condenser 2, a receiver 3, an expansion valve (pressure reducing means) 4 and an evaporator 5.

An air-conditioning case 6 defines a passage leading to an interior of the vehicle for providing the conditioned air and houses the evaporator 5. The evaporator 5 is a heat exchanger for cooling the air. In the evaporator 5, a low pressure two phase (gas-liquid) refrigerant that is supplied from the expansion valve 4 absorbs heat from the air blown from a blower 7 and evaporates to cool the air.

The blower 7 includes a centrifugal fan 7a and a fan drive motor 7b. Inside air or outside air is drawn into an air inlet 7c of the blower 7 through an inside/outside air switching box (not shown). In the air-conditioning case 6, a heater core 8 is arranged downstream of the evaporator 5.

The heater core 8 is a heat exchanger using hot water as its heat source for heating the air. Above the heater core 8 in the air-conditioning case 6, there is a bypass passage 8a. In order to adjust a ratio between the cool air passing through the bypass passage 8a and the warm air passing through the heater core 8, a plate like air mix door 9 is pivotally arranged adjacent to the heater core 8. The air mix door 9 is driven by a servomotor 9a.

The mixed air, which has a predetermined temperature after mixing of the cool air and the warm air, is blown toward the various regions (inside surfaces of vehicle window glasses and upper half side and foot side of a vehicle passenger) of the vehicle interior through a defroster opening 14, a face side opening 15 and a foot side opening 16, which are opened or closed by operating corresponding blow mode switching doors 11, 12, 13. Like the air mix door 9, each blow mode switching door 11, 12, 13 is driven by a servomotor (not shown). Hot water (cooling water) of a vehicle engine 20 is circulated through the heater core 8.

The engine 20 acts as a drive source for running the vehicle as well as a drive source for operating various auxiliary devices, such as the compressor 1. The motor 21 is a motor/generator that is driven by the engine 20 to act as the generator while the engine 20 is operated. The motor 21 has three functions, i.e., the drive source for driving the auxiliary devices (such as the compressor 1) during the non-operating period of the engine 20, the generator driven by the engine 20 for charging a vehicle battery 50 during the operating period of the engine 20 (during the running period of the vehicle), and a starter for starting the engine 20.

Specifically, the motor 21 is a three-phase dynamo-electric machine, which acts as a three-phase motor with its rotor being driven by three-phase alternating current supplied from a drive circuit to generate a rotating force while being used as the motor and also acts as a three-phase generator with its rotor being driven by the engine 20 to generate electricity while being used as the generator. The three-phase alternating current is rectified to provide direct current that is fed to the battery 50 to charge the same.

An electromagnetic clutch 22 is provided on a crankshaft of the engine 20. The rotation of the engine 20 is transmitted to a crank pulley 23 through the electromagnetic clutch 22. The rotation of the pulley 23 is transmitted to a pulley 1a of the compressor 1 and a pulley 21a of the motor 21 via a belt 24. An electromagnetic clutch 25 is provided to the pulley 1a of the compressor 1 to enable or disable transmission of the rotation to the compressor 1.

With the described arrangement, the compressor 1 is selectively driven by the engine 20 or the motor 21. That is, while the engine 20 is stalled, for example, while the vehicle is not running, the compressor 1 is driven by the motor 21. On the other hand, while the engine 20 is operated (while the vehicle is running), the compressor 1 is driven by the engine 20.

Although not shown in FIG. 1, the rotation of the crank pulley 23 is transmitted to other undepicted auxiliary devices (such as a cooling water pump, a hydraulic motor for driving a power steering, or the like) via the belt 24. Therefore, like the compressor 1, these auxiliary devices can be driven by the motor 21 during the non-operating period of the engine 20. As an alternative to the electromagnetic clutch 22 of the crankshaft of the engine 20, there may be provided a clutch mechanism (one way clutch) that only transmits the rotation of the engine 20 to the crank pulley 23 and blocks transmission of the driving force from the motor 21 to the engine 20. However, in such a case, a dedicated starter needs to be provided for starting the engine 20.

The compressor 1 of the present embodiment is a variable displacement compressor that can change its displacement (amount of refrigerant discharged per rotation of the compressor 1). A construction of the variable displacement compressor 1 is well known in the art, and the variable displacement compressor disclosed in Japanese Patent Publication No. 2661121 can be used for this embodiment. The variable displacement compressor 1 disclosed in this publication has a swash plate that is connected to a rotating shaft. A piston used for suctioning, compressing and discharging the refrigerant is reciprocated by the rotation of the swash plate.

Furthermore, there is provided an electromagnetic pressure control device 1b for adjusting a control pressure acting on the swash plate. The control pressure is adjusted by the amount of electric current In supplied to an electromagnetic coil of the electromagnetic pressure control device 1b. By adjusting the control pressure, a tilt angle of the swash plate is changed to change a stroke of the piston, resulting in a change in the compressor displacement. Therefore, the electromagnetic pressure control unit 1b constitutes a displacement varying means, and the amount of electric current In can be controlled through a continuous control or a duty control.

The engine 20, the motor 21 and the auxiliary devices (including at least the air conditioning system) have its own control unit 30, 31, 32. Each control unit 30, 31, 32 includes a microcomputer and peripheral circuits and is capable of communicating with other control units 30, 31, 32. Electric power is supplied from the battery 50 to each control unit 30, 31, 32 through an ignition switch 51 of the engine 20.

The air conditioning control unit 32 is connected with an outside air temperature sensor 33 for measuring an outside air temperature Tam of the vehicle, an interior air temperature sensor 34 for measuring an interior air temperature Tr of the vehicle, a solar radiation sensor 35 for measuring the amount of solar radiation Ts reaching the interior of the vehicle, an evaporator temperature sensor 36 for measuring an outlet air temperature Te as an indication of the degree of coolness of the evaporator 5, a water temperature sensor 37 for measuring a hot water temperature Tw of the heater core 8 and the like.

An air-conditioning control panel 38 arranged adjacent to an instrument panel inside the vehicle includes various control elements including a temperature selector 39 for selecting an interior air temperature Tset of the vehicle, an air-conditioning switch 40 for providing an on/off signal for the compressor 1, a blow mode select switch 41 for providing a signal for selecting a blow mode, an air flow rate select switch 42 for providing a signal for selecting an air flow rate of the blower 7, an inside/outside air select switch 43 for providing a signal for switching the intake air between the inside air and the outside air and the like. The control signals of these control elements are also fed to the air-conditioning control unit 32.

Operations of the first embodiment will now be described with reference to a flowchart of FIG. 2. The air-conditioning control unit 32 conducts various operations based on the flowchart of FIG. 2.

(Basic Process Flow)

Figure 2:
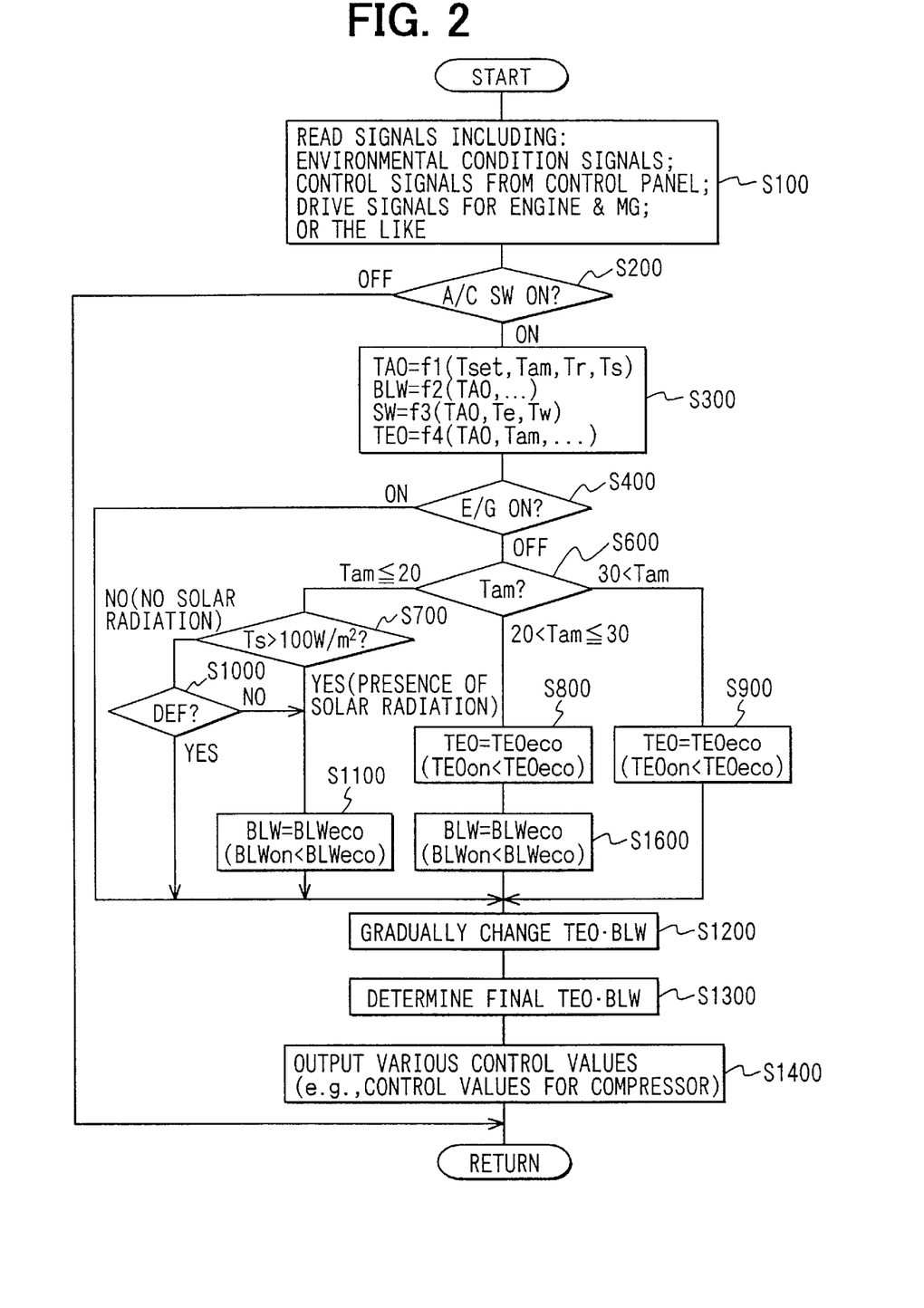
FIG. 2 is a flowchart showing the first embodiment of the present invention.

The control routine of FIG. 2 starts when the ignition switch 51 of the engine is turned on, and control proceeds to step 100 where various signals are read. That is, signals indicative of the vehicle environmental conditions measured with the various sensors 33–37 including the interior air temperature Tr, the outside air temperature Tam, the hot water temperature (cooling water temperature) Tw, the amount of solar radiation Ts, the evaporator outlet air temperature Te and the like are read. Furthermore, control signals, such as the selected interior air temperature Tset, supplied from the air-conditioning control panel 38, an engine drive signal supplied from the engine control unit 30, and a motor drive signal supplied from the motor (MG) control unit 31 are also read.

Then, at step S200, it is determined whether the air-conditioning switch 40 is "ON" or "OFF". If the air-conditioning switch 40 is "ON", control moves to step S300. At step S300, a target outlet air temperature TAO of the air to be blown out from the air conditioning system toward the interior of the vehicle, a target air flow level BLW of the blower 7, a target angular position SW of the air mix door 9 and a target evaporator outlet air temperature TEO are computed in a manner similar to a general prior art automatic air conditioning system.

More specifically, the target outlet air temperature TAO is a temperature of the air to be blown out from the air-conditioning system required to maintain the interior air temperature of the vehicle at the selected interior air temperature Tset and is computed based on Tset, Tam, Tr and Ts. The target air flow level BLW of the blower 7 is computed based on TAO. The target angular position SW of the air mix door 9 is computed based on TAO, Te and Tw. The target evaporator outlet air temperature TEO of the evaporator 12 is computed based on TAO, Tam and the like.

Specifically, the target air flow level BLW corresponds to a level of voltage that is applied to the drive motor 7b of the blower 7 and that determines a rotation speed of the drive motor 7b. In this embodiment, the target air flow level BLW is divided into 32 levels between a minimum air flow level (Lo) and a maximum air flow level (Hi). When the target outlet air temperature TAO is in a low temperature range or in a high temperature range, the target air flow level BLW becomes high. Furthermore, when the target outlet air temperature TAO is in a middle temperature range, the target air flow level BLW becomes low.

Then, control proceeds to step S400 where it is determined whether the engine is operated based on the engine drive signal read at step S100. While the engine is operated, control moves to step S1200 without modifying any results computed in the manner similar to the general automatic air conditioning system at step S300.

On the other hand, if the engine is not operated, control proceeds to step S600 to conduct an air-conditioning control (eco-run control) flow for a non-operating period of the engine. In this control operation, TEO and BLW, which are computed in the manner similar to the general automatic air conditioning system, are modified, and then control proceeds to step S1200. This control operation will be described in detail later.

At step S1200, TEO and BLW are gradually changed to avoid any inconvenience (for example, unpleasant feeling of air-conditioning as well as increased vibrations and noises due to a change in torque of the variable displacement compressor 1). That is, at step 1200, previously determined TEOpre and BLWpre are compared with the currently determined TEO and BLW, respectively. When a deviation EnTEO (=TEO−TEopre) or a deviation EnBLW (=BLW−BLWpre) is greater than a corresponding predetermined value (for example, EnTEO>5 degrees Celsius or EnBLW>level 10), temporary TEO' or BLW' are determined as a temporary target value.

TEO' and BLW' are used to provide an upper limit for a rate of change of TEO and BLW to allow a gradual change from the previously determined TEOpre to the currently determined TEO as well as a gradual change from the previously determined BLWpre to the currently determined BLW over time avoiding rapid changes in these values. Therefore, TEO' and BLW' are intermediate values between the previously determined TEOpre and BLWpre and the currently determined TEO and BLW. The rate of change of TEO is a change in the temperature per unit time, and the rate of change of BLW is a change in the amount of air flow per unit time. After the upper limit is imposed to the rate of change of TEO and the rate of change of BLW, the rate of change of TEO and the rate of change of BLW are called as a rate of gradual change of TEO and a rate of gradual change of BLW, respectively.

With such a control operation to achieve the gradual changes of TEO and BLW, a rapid temperature change and a rapid air flow change can be avoided. Furthermore, especially, if the compressor 1 is the variable displacement compressor as in the present embodiment, an increase in the vibration level as well as an increase in the noise level induced by a rapid displacement change (torque change) of the compressor can be effectively avoided, so that unpleasant feeling of the passenger can be prevented.

At step S1300; the currently determined TEO and BLW are compared with the temporary target values TEO' and BLW' determined at step S1200, and ones that are closer to the previously determined values TEOpre and BLWpre are used as final target values TEOend and BLWend. In FIG. 2, the final target values TEOend and BLWend are simply indicated as the final TEO and BLW for simplicity.

At next step S1400, the target angular position SW of the air mix door computed at step S300 as well as the final target values TEOend and BLWend determined at step S1300 are inputted to the corresponding control means. That is, in the control operation of the air mix door 9, an operating angle of the drive servo motor 9a for the air mix door 9 is controlled to adjust an actual angular position of the air mix door 9 to coincide with the target angular position SW of the air mix door. In the control operation of the variable displacement compressor 1, the displacement of the compressor 1 is variably controlled to adjust an actual evaporator outlet air temperature Te measured with the temperature sensor 36 to coincide with the final target value TEOend. Even if the displacement of the variable displacement compressor 1 is minimum, the electromagnetic clutch 25 is disengaged to stop the compressor 1 when the evaporator outlet air temperature Te is lower than the final target value TEOend as well as when the operation of the compressor 1 is not required.

Regarding the air flow of the blower 7, a voltage to be applied to the drive motor 7b of the blower 7 is controlled to achieve the final target air flow level BLWend. The voltage to be applied to the drive motor 7b can be controlled by a continuous control or a pulse width modulation control (PWM control).

(Air-conditioning System Control Flow for Non-operating Period of Engine)

The air-conditioning control (eco-run control) flow for the non-operating period of the engine starts at Step S600. At step S600, it is determined whether the current outside air temperature Tam is in a low outside air temperature range (less than or equal to 20 degrees Celsius), a middle outside air temperature range (grater than 20 degree Celsius but less than or equal to 30 degrees Celsius), or a high outside air temperature range (greater than 30 degrees Celsius). If the current outside air temperature is in the low temperature range, control passes to step S700. If the current outside air temperature is in the middle temperature range, control passes to step S800. If the current outside air temperature is in the high temperature range, control passes to step S900.

(1) Control Operation under Low Outside Air Temperature condition.

Under the low outside air temperature condition (outside air temperature Tam.20 degrees Celsius), the amount of solar radiation Ts reaching the interior of the vehicle is determined at step S700. That is, it is determined whether the window glass of the vehicle is disposed to a low outside air temperature condition where a temperature of the window glass tends to decrease due to weak sunshine, rain, snow or the like. Alternatively, window glass temperature sensing means can be provided to determine whether the temperature of the window glass is high or low. When the amount of solar radiation Ts is less than or equal to a predetermined value (e.g., 100 W/m$^2$), it is determined that the window glass is placed under a fog inducing condition where fogging of the window glass tends to occur. Then, control proceeds to step S1000 where it is determined whether the current blow mode is a defroster (DEF) mode.

The defroster mode is one of the blow modes that clears fog on the window glass by directly blowing the air toward the inner surface of the window glass from the defroster opening 14 and is particularly used under the fog inducing condition. Therefore, if it is determined that the current blow mode is the defroster mode at step S1000, control escapes from the air-conditioning control flow for the engine non-operating period and jumps to step S1200 to prevent fogging of the window glass. That is, when the defroster mode is selected, any control operation that causes a decrease in the power of the blower 7 or the compressor 1 is not allowed to effectively prevent the fogging of the window glass even if the engine is not operated.

On the other hand, if it is determined that the amount of the solar radiation Ts is greater than or equal to the predetermined value at step S700 or if it is determined that the current blow mode is not the defroster mode at step S1000, control proceeds to step S1100 where the target air flow level is set to be BLWeco. BLWeco is set to be a value that is smaller than the most recent BLWon that is the target air flow level during the operating period of the engine. For example, BLWon can be 80% of the target air flow level BLWon at the time of engine stall (or alternatively, around, before or after the time of engine stall).

In the low outside air temperature condition, a temperature of the window glass is low, so that the window glass is under the fog inducing condition. Therefore, a dehumidifying capacity of the cooling evaporator 5 should be maintained to prevent fogging of the window glass. Therefore, in the low outside air temperature condition, while the engine is not operated, the target evaporator outlet air temperature TEO should not be changed to a higher temperature level. Instead of changing the target evaporator outlet air temperature TEO, the target air flow level BLW is reduced.

In this way, in the low outside air temperature condition, while the engine is not operated, a cooling load can be reduced by reducing the air flow without reducing the anti-fogging performance, allowing reduction of the power consumption.

(2) Control Operation under Middle Outside Air Temperature Condition

Under the middle outside air temperature condition (20 degrees Celsius<outside air temperature Tam.30 degrees Celsius), the target evaporator outlet air temperature TEO is set to be TEOeco at step S800. TEOeco is set to be a value that is greater than the most recent TEOon that is the target evaporator outlet air temperature during the operating period of the engine.

More specifically, for example, if the TEOon is 5 degrees Celsius at the time of engine stall (or alternatively, around, before or after the time of engine stall), a value (in this instance, 15 degrees Celsius) obtained by adding a predetermined value (for example, 10 degrees Celsius) to TEOon (5 degrees Celsius) is compared with the upper limit value of TEO (for example, 12 degrees Celsius) that is determined based on the passenger's feeling of comfort, and one that is smaller than other one is set as the TEOeco. Therefore, in the described instance, TEOeco=12 degrees Celsius.

Even in the middle outside air temperature condition (for example, 25 degrees Celsius), if the solar radiation is present, a heat load is increased, causing the interior air temperature to exceed the selected interior air temperature Tset, and the passenger may have an uncomfortable hot sensation due to the presence of the solar radiation. Therefore, TEO under the presence of the solar radiation is set to be lower than its upper limit determined based on the passenger's feeling of comfort under no solar radiation. However, when a vehicle stops for a short period of time (for example waiting for a traffic signal to change or waiting for a train to pass), the interior air temperature of the vehicle does not rise quickly due to a heat capacity of the vehicle, and the heat sensation of the passenger due to the solar radiation does not increase quickly. Therefore, the rise of the outlet air temperature does not deteriorate the passenger's feeling of coolness.

From the described point of view, by changing the target evaporator outlet air temperature TEO to TEOeco that is higher than TEOon of the engine operating period to reduce the displacement of the compressor 1 at step S800, the power consumption required for driving the compressor 1 can be reduced. Furthermore, at the following step S1600, the air flow is reduced by the operation similar to that discussed with respect to step S1100.

In essence, under the middle outside air temperature condition, the cooling heat load of the evaporator 5 is smaller than that of the high outside air temperature condition described below (the cooling heat load is less than or equal to a predetermined value), and the fogging of the window glass is less likely to occur in comparison to the low outside air temperature condition. Therefore, in addition to the reduction of the power consumption required for driving the compressor 1, the power consumption required for driving the blower 7 can also be reduced.

As described above, by raising TEO without exceeding its upper limit (for example, 12 degrees Celsius) determined based on the passenger's feeling of comfort to reduce the displacement of the compressor 1 and also by reducing the air flow, the power consumption during the non-operating period of the engine can be reduced without sacrificing the passenger's feeling of comfort.

(3) Control Operation under High Temperature Condition

Under the high temperature condition (outside air temperature Tam>30 degrees Celsius), the target evaporator outlet air temperature TEO is raised at step S900 in a manner similar to that discussed with respect to step S800. Under the high temperature condition, the rise of the outlet air temperature does not quickly deteriorate the passenger's feeling of coolness as discussed with respect to the control operation under the middle temperature condition. Furthermore, since the target outlet air temperature TAO is reduced, the air flow is accordingly increased. As a result, the passenger's feeling of coolness is largely dependent upon the passenger's sensation of draft.

Because of this fact, under the high outside air temperature condition, the displacement of the compressor 1 is reduced by raising TEO (the temperature of the air blown out from the air conditioning system to the interior of the vehicle) without decreasing the air flow. In this manner, even under the high outside air temperature condition, the power consumption required for driving the compressor 1 can be reduced without deteriorating the passenger's feeling of comfort, allowing the power saving during the non-operating period of the engine.

As discussed above, in the wide outside air temperature range (from the low to high outside air temperature ranges), the power consumption during the non-operating period of the engine (i.e., during the operating period of the motor that drives the compressor 1) can be reduced without sacrificing the anti-fogging performance and the feeling of coolness, allowing implementation of a smaller capacity or a smaller size of the battery 50.

If the smaller capacity of the battery 50 is not required, the fuel consumption during the non-running period of the vehicle can be advantageously reduced since a time period between the engine stall and the engine restart can be lengthened due to the reduced power consumption.

(Second Embodiment)

Figure 3:
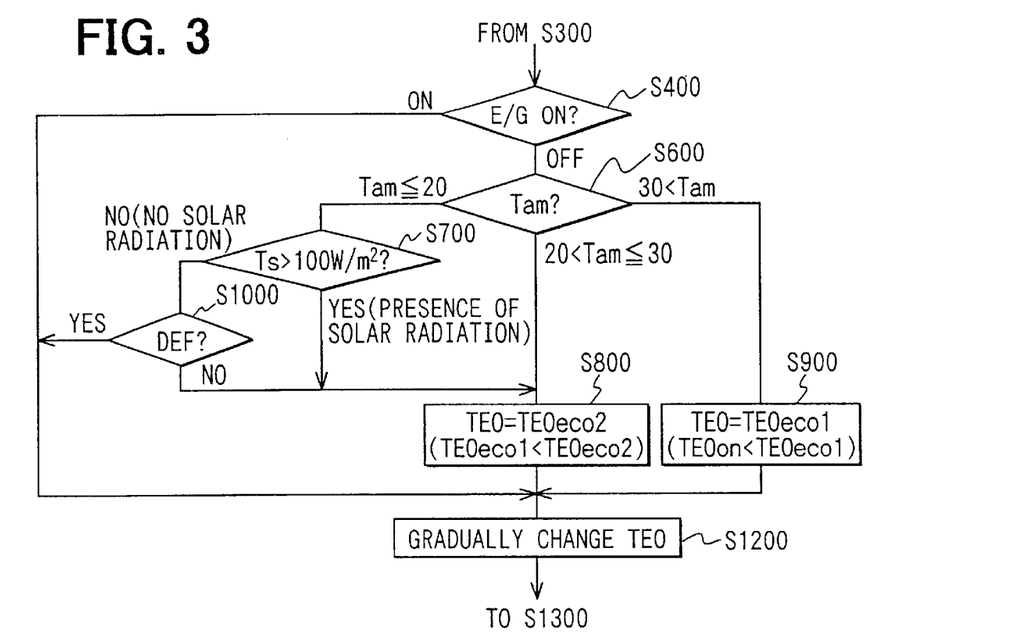
FIG. 3 is a flowchart showing a feature of the second embodiment of the present invention.

FIG. 3 shows a flowchart indicating a main feature of a second embodiment of the present invention. In the second embodiment, steps S1100 and S1600 of the air-conditioning control flow for the non-operating period of the engine of the first embodiment are eliminated, and only the control operation for changing TEO to the higher temperature level at steps S800 and S900 is carried out.

In the second embodiment, at S900 that is carried out under the high outside air temperature condition, TEOeco1 is set. TEOeco1 is a value that is greater than the most recent target evaporator outlet air temperature TEOon of the engine operating period. At step S800 that is carried out under the middle outside air temperature condition, TEOeco2 is set. TEOeco2 is a value that is greater than TEOeco1.

That is, by establishing the following relationship: TEOon<TEOeco1<TEOeco2, the power consumption during the non-operating period of the engine is improved.

(Third Embodiment)

Figure 4:
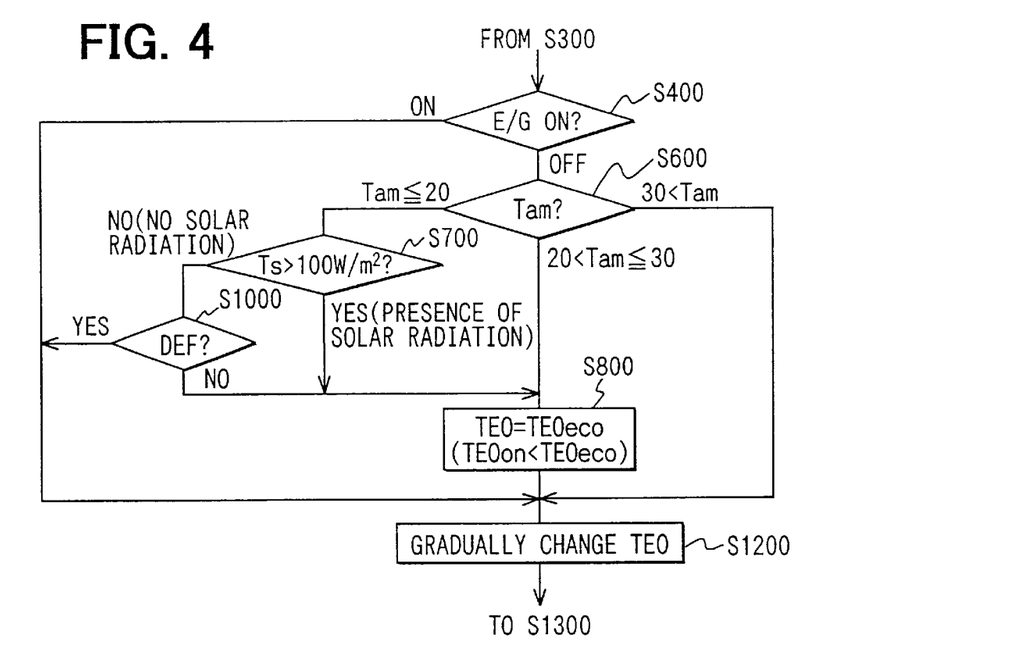
FIG. 4 is a flowchart showing a feature of the third embodiment of the present invention.

FIG. 4 shows a flowchart indicating a main feature of a third embodiment of the present invention. In the third embodiment, step S900 of the second embodiment is eliminated, and only the control operation for changing TEO to the higher temperature level at step S800 is carried out. That is, under both the low and middle outside air temperature conditions, TEO=TEOeco is established at step S800 to change TEO to the higher temperature level, allowing the power saving. On the other hand, under the high outside air temperature condition, TEO is not changed to the higher temperature level, sacrificing the power saving to maintain the cooling performance.

(Fourth Embodiment)

Figure 5:
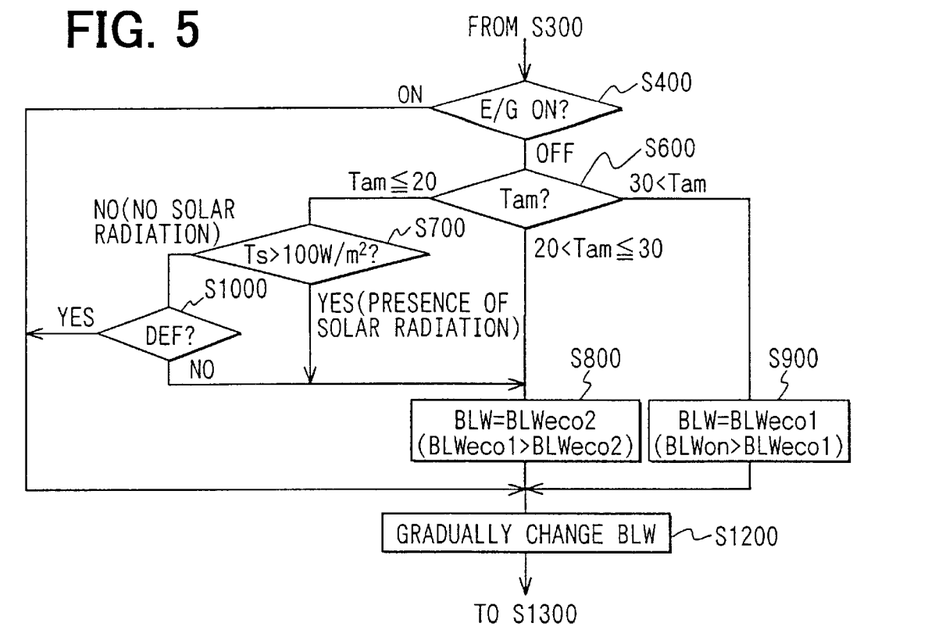
FIG. 5 is a flowchart showing a feature of the fourth embodiment of the present invention.

FIG. 5 shows a flowchart indicating a main feature of a fourth embodiment of the present invention. In the second embodiment, the control operation for changing TEO to the higher temperature level is implemented at steps S800 and S900. In the fourth embodiment, instead of changing TEO to the higher temperature level, the target air flow level BLW is changed to the lower target air flow levels BLWeco1 and BLWeco2 at steps S800 and S900.

The following relationship is established for the target air flow level BLWon at the time of engine stall (or alternatively, around, before or after the time of engine stall).

That is, BLWon>BLWeco1>BLWeco2 is established. With this relationship, the power saving by decreasing the air flow can be achieved under any of the low, middle and high outside air temperature conditions.

(Fifth Embodiment)

Figure 6:
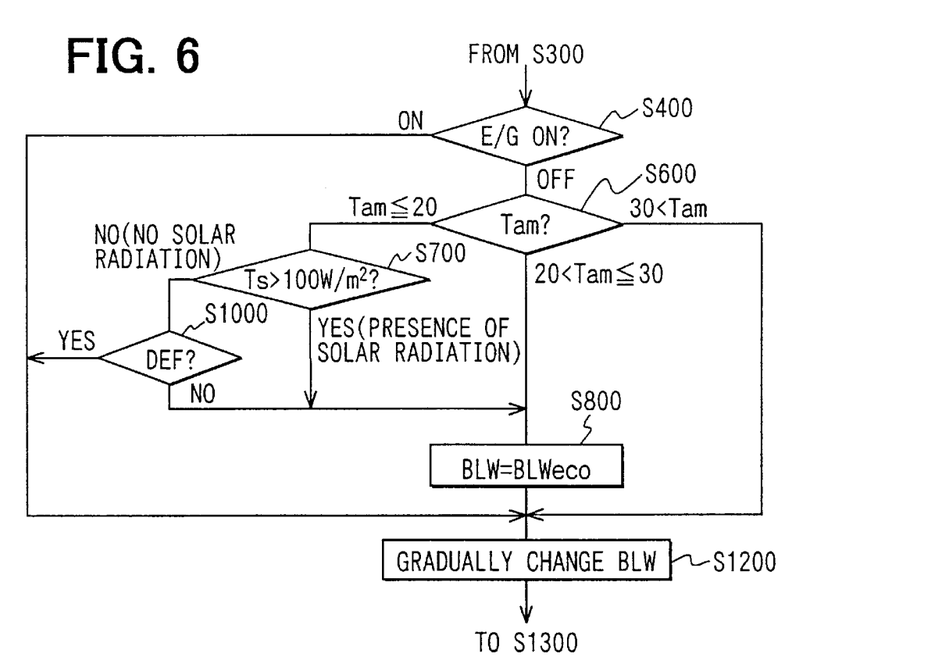
FIG. 6 is a flowchart showing a feature of the fifth embodiment of the present invention.

FIG. 6 shows a flowchart indicating a main feature of a fifth embodiment of the present invention. In the fifth embodiment, step S900 of the fourth embodiment is eliminated, and only the control operation for changing the target air flow level BLW to the lower air flow level BLWeco at step S800 is carried out. That is, under both the low and middle outside air temperature conditions, BLW=BLWeco is established at step S800 to change BLW to the lower air flow level, allowing the power saving. On the other hand, under the high outside air temperature condition, BLW is not changed to the lower air flow level, sacrificing the power saving to maintain the cooling performance.

(Sixth Embodiment)

Figure 7:
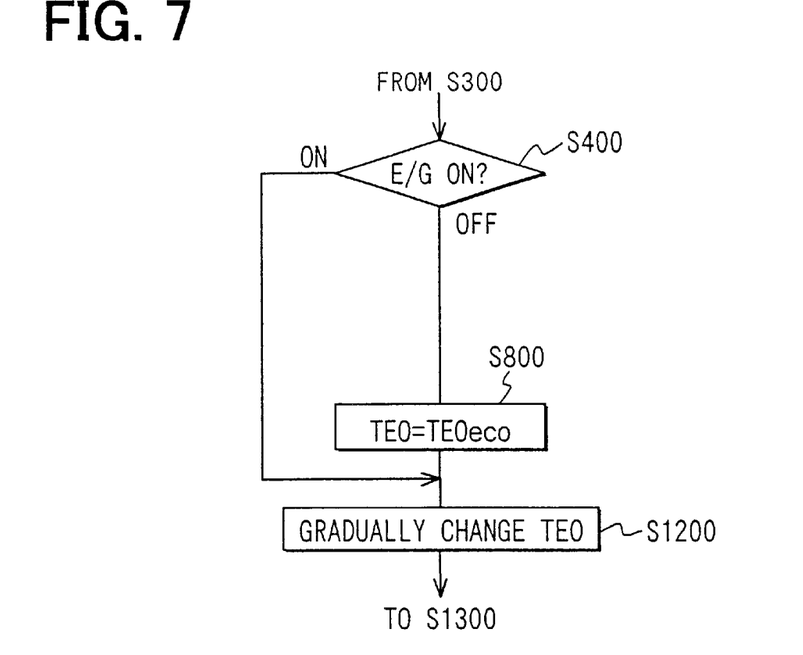
FIG. 7 is a flowchart showing a feature of the sixth embodiment of the present invention.

FIG. 7 shows a flowchart indicating a main feature of a sixth embodiment of the present invention. In the sixth embodiment, the air conditioning operation for non-operating period of the engine is not carried out for each of the low, middle and high outside air temperature conditions. Instead, at step S800, TEO=TEOeco is established, and only the control operation for changing TEO to the higher temperature level is carried out.

(Seventh embodiment)

Figure 8:
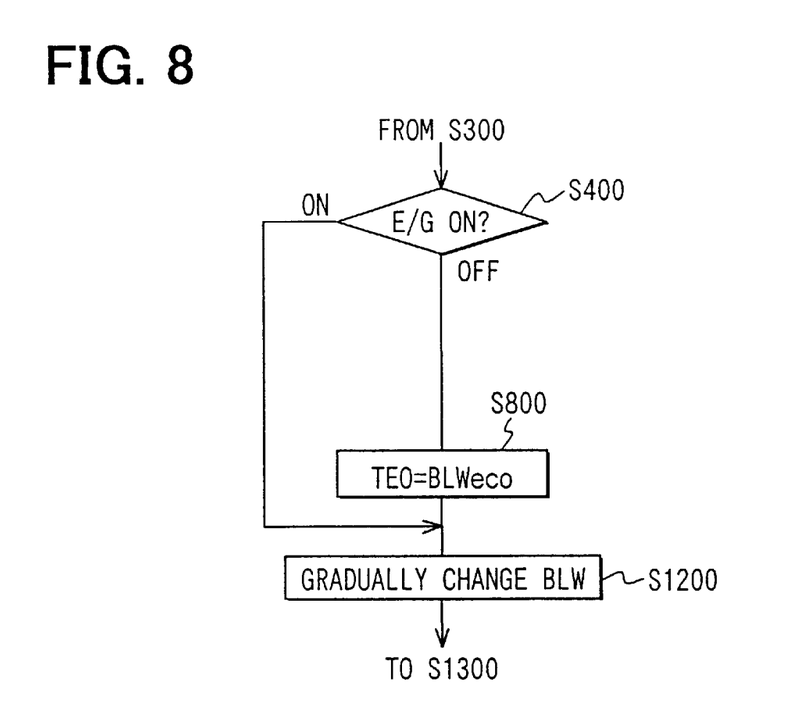
FIG. 8 is a flowchart showing a feature of the seventh embodiment of the present invention.

FIG. 8 shows a flowchart indicating a main feature of a seventh embodiment of the present invention. In the seventh embodiment, the air conditioning operation for non-operating period of the engine is not carried out for each of the low, middle and high outside air temperature conditions. Instead, at step S800, BLW=BLWeco is established, and only the control operation for changing BLW to the lower air flow level is carried out.

(Eighth Embodiment)

Figure 9:
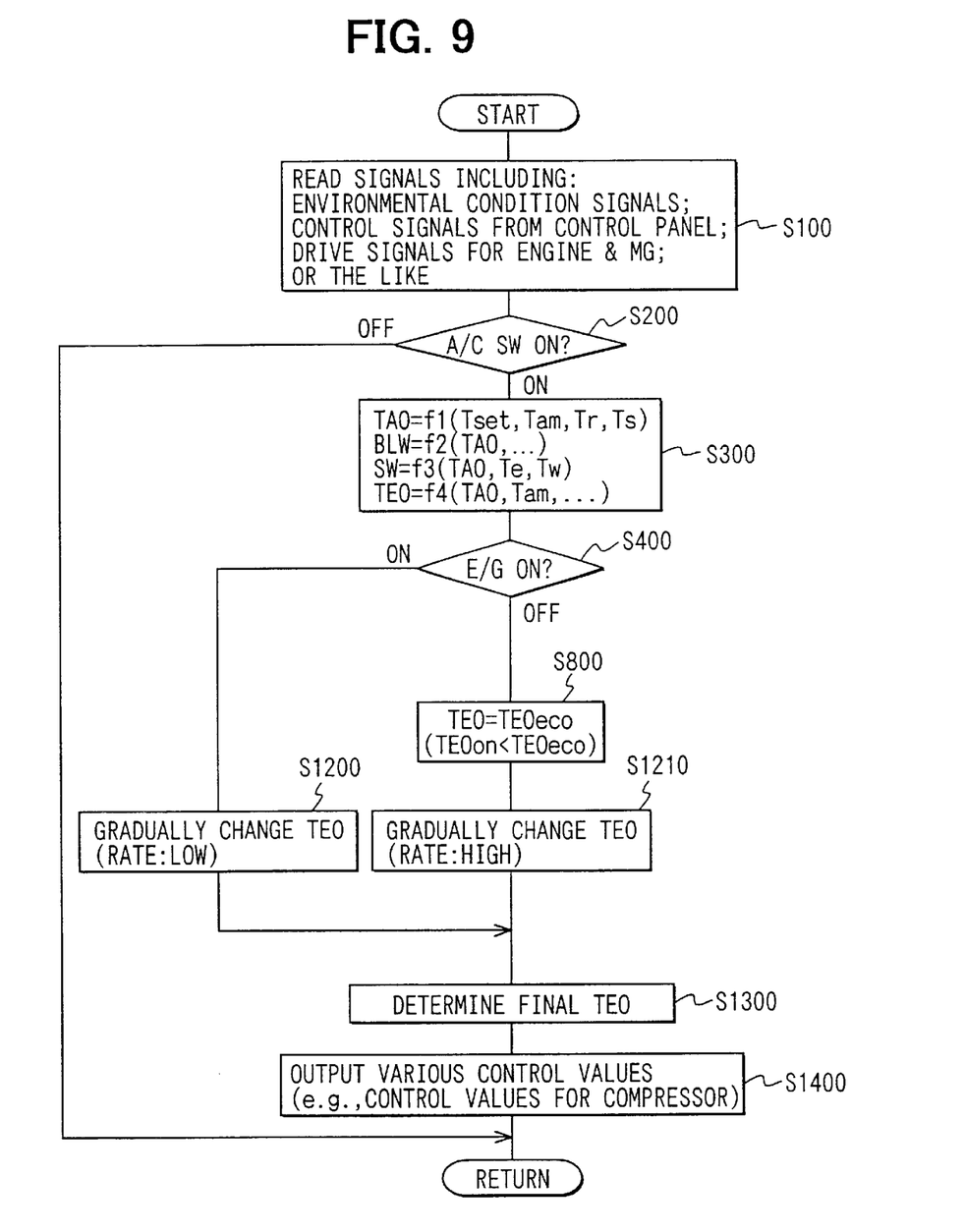
FIG. 9 is a flowchart showing operations of the eighth embodiment of the present invention.

FIG. 9 shows a flowchart of an eighth embodiment. In the eighth embodiment, the control operation for implementing gradual change of TEO differs between the operating period and non-operating period of the engine. The rate of gradual change of TEO during the non-operating period of the engine is increased relative to the rate of gradual change of TEO during the operating period of the engine.

The operation of the eighth embodiment will be described with reference to FIG. 9. Since the basic flow of the eighth embodiment is the same as that of the first embodiment, the details of the basic flow is not further described. At step S400, if it is determined that the engine 200 is operated, control moves to step S1200. At step S1200, the previously determined TEOpre is compared with the currently determined TEO. When a deviation EnTEO is large (for example, EnTEO>5 degrees Celsius), the temporary TEO' that is an intermediate value between TEOpre and TEO is determined. Like the first embodiment, TEO' is used to provide an upper limit for the rate of change of TEO (implementing the rate of gradual change) to allow gradual change from TEOpre to TEO over time.

On the other hand, if it is determined that the engine is not operated (i.e., the compressor 1 is driven by the motor) at step S400, control proceeds to step S800. At step S800, the target evaporator outlet air temperature TEO is set to be TEOeco that is higher than TEOon of the engine operating period by a predetermined amount. The operation of step S800 is the same as that of the first embodiment.

Then control proceeds to step S1210 where the previously determined TEopre is compared with the currently determined TEO. When a deviation EnTEO between these values is greater than a predetermined value (for example, EnTEO>5 degrees Celsius), the temporary target value TEO" that is an intermediate value between TEOpre and TEO is determined.

TEO" is used to provide an upper limit for the rate of change of TEO (implementing the rate of gradual change) to allow a gradual change from TEOpre to TEO over time. The temporary target value TEO" obtained at step S1210 provides the higher rate of gradual change of TEO in comparison to the temporary target value TEO' obtained at step S1200. The rest of steps in the eighth embodiment are the same as that of the first embodiment.

In the eighth embodiment, the target evaporator outlet air temperature TEO for the non-operating period of the engine is changed to TEOeco that is higher than TEOon of the engine operating period by a predetermined amount. Furthermore, there is provided the temporary target value TEO", which provides the higher rate of change in comparison to the temporary target value TEO' that is provided during the operating period of the engine. Thus, upon stall of the engine, TEO is quickly raised to quickly reduce the displacement of the variable displacement compressor 1, allowing quick reduction of the power consumption required for driving the compressor 1.

Furthermore, in the eighth embodiment, the passenger's feeling of comfort can be maintained for the following reasons. During the non-operating period of the engine, the variable displacement compressor 1 is driven by the motor 21, so that there is a change in a rotation speed of the motor 21 due to a change in the displacement (torque) of the compressor 1. However, the weight of the motor 21 is far smaller than that of the engine 20. Thus, while the engine is not operated (i.e., while the motor is operated), even if the change in the rotation speed of the motor 21 takes place, a corresponding change in the vibration level as well as a corresponding change in the noise level are typically much smaller in comparison to those induced by a change in the rotation speed of the engine 20.

As a result, during the operation period of the engine, the passenger's feeling of comfort in terms of the vibrations and noises cannot be assured unless sufficiently reducing the rate of gradual change conducted for limiting the change in the vibration level as well as the change in the noise level that are induced by the change in the rotation speed of the engine 20 in comparison to the rate of gradual change conducted for preventing the passenger's unpleasant feeling due to the change in the temperature and the change in the wind flow.

Therefore, during the operation period of the engine, the rate of gradual change of TEO must be sufficiently reduced in order to limit the change in the vibration level and the change in the noise level that are induced by the change in the displacement (torque) of the variable displacement compressor 1.

In contrast, while the motor 21 is operated upon the engine stall, since the motor 21 is relatively lightweight, even if the rate of gradual change of TEO is increased, the change in the vibration level as well as the change in the noise level that are induced by the change in the displacement (torque) of the variable displacement compressor 1 can be effectively limited, allowing maintenance of the passenger's feeling of comfort.

(Ninth Embodiment)

Figure 10:
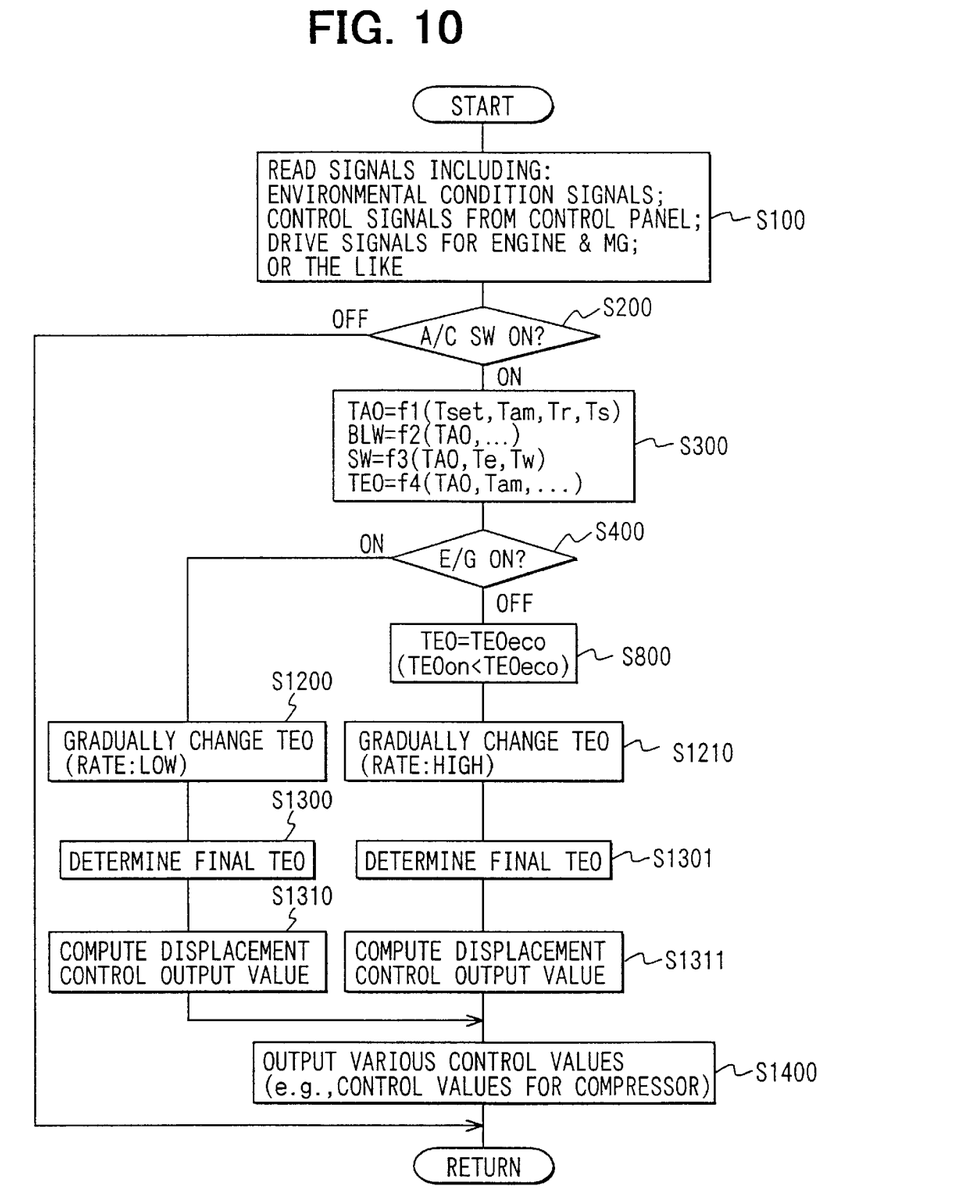
FIG. 10 is a flowchart showing operations of the ninth embodiment of the present invention.

FIG. 10 shows a flowchart of a ninth embodiment. There is provided an additional feature for switching a way of computing an output value for controlling the displacement of the variable displacement compressor 1 between two forms, one for operating period of the engine and other for non-operating period of the engine.

The operation of the ninth embodiment will be described with reference to FIG. 10. When it is determined that the engine 20 is operated at step S400, control moves to step S1200. At step S1200, the previously determined TEOpre is compared with the currently determined TEO. If the deviation EnTEO between these two values is large (for example, EnTEO>5 degrees Celsius), the temporary target value TEO', which is the intermediate value between TEOpre and TEO, is determined.

Then, at step S1300, the currently determined TEO is compared with the temporary target value TEO' determined at step S1200, and one that is closer to the previously determined TEOpre is used as the final target value TEOend.

Thereafter, at step S1310, a deviation EnTEO between the final target value TEOend and the actual evaporator outlet air temperature Te measured with the temperature sensor 36 is computed. Then, the output value for controlling the compressor displacement (more specifically, electric current In supplied to the electromagnetic pressure control device 1*b*) is computed in a manner that increases the change in the displacement as the deviation EnTEO becomes larger. The computation of the output value for controlling the displacement can be carried out through the well known proportional-plus-integral control.

On the other hand, if it is determined that the engine 20 is not operated (i.e., the compressor 1 is driven by the motor) at step S400, control moves to step S800. At step S800, the target evaporator outlet air temperature TEO is changed to be TEOeco that is higher than TEOon of the engine operating period. The operation of step S800 is the same as that of the first embodiment.

Then, control proceeds to step S1210 where the previously determined TEOpre is compared with the currently determined TEO. When a deviation EnTEO between these values is large (for example, EnTEO>5 degrees Celsius), the temporary target value TEO" that is an intermediate value between TEOpre and TEO is determined. The temporary target value TEO" obtained at step S1210 provides the higher rate of gradual change of TEO in comparison to the temporary target value TEO' obtained at step S1200. That is, the rate of gradual change of TEO is set to be low at step S1200, and the rate of gradual change of TEO is set to be high at step S1210.

Next, at step S1301, the currently determined TEO is compared with the temporary target value TEO" obtained at step S1210, and one that is closer to the previously determined TEOpres is used as the final target value TEOend.

Thereafter, at step S1311, the output value for controlling the compressor displacement (the electric current In supplied to the electromagnetic pressure control device 1b) is computed in a manner that increases the change in the displacement as the deviation EnTEO between the final target value TEOend and the actual evaporator outlet air temperature Te measured with the temperature sensor 36 becomes larger. The computation of the output value for controlling the displacement can be carried out through the well known proportional-plus-integral control.

In step S1311 that is provided for the non-operating period of the engine, the output value for controlling the compressor displacement is computed in a manner that provides a larger change in the displacement even if the deviation EnTEO is the same as that of step S1310 that is provided for the operating period of the engine. More specifically, a proportionality factor of the proportional-plus-integral control formula used at step S1311 is set to be larger than that of the proportional-plus-integral control formula used at step S1310, so that the rate of change of the output value for controlling the compressor displacement relative to the deviation EnTEO (that is, the rate of gradual change of the output value for controlling the compressor displacement) becomes higher at step S1311.

In the ninth embodiment, while the engine is not operated, the target evaporator outlet air temperature TEO is changed to be TEOeco that is higher than TEOon of the engine operating period by a predetermined amount. Furthermore, there is provided the temporary target value TEO" that provides the greater rate of change in comparison to that of the temporary target value TEO', which is provided during the operating period of the engine. Therefore, TEO can be quickly raised upon the engine stall.

In addition, there is an increase in the rate of gradual change of the output value for controlling the compressor displacement, which is controlled to adjust the actual Te to be the target TEO, so that it is possible to quickly reduces the displacement of the compressor 1. This allows more quick reduction of the power consumption of the compressor 1 to further improve the power saving.

The rate of gradual change of the target value TEO is increased while the engine is not operated in the eighth embodiment. Furthermore, the rate of gradual change of the target value TEO as well as the rate of gradual change of the output value for controlling the compressor displacement are increased while the engine is not operated in the ninth embodiment. However, by increasing the rate of gradual change of the target air flow level BLW during the non-operating period of the engine in comparison to the rate of gradual change of the target air flow level BLW during the operating period of the engine, the air flow during the non-operating period of the engine can be quickly reduced, allowing improvement of the power saving. Furthermore, these operations can be conducted in a combination.

(Tenth Embodiment)

Figure 11:
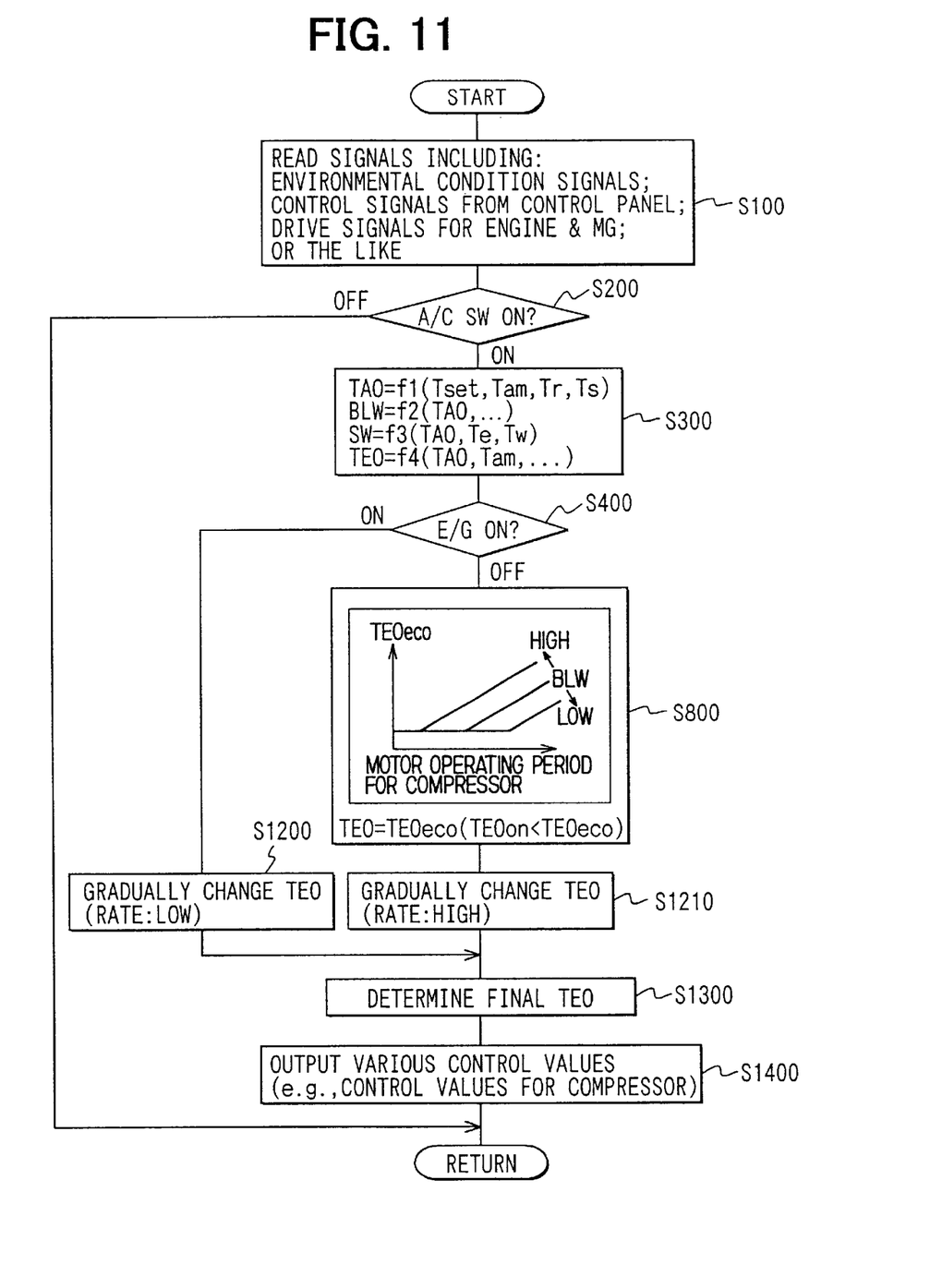
FIG. 11 is a flowchart showing operations of the tenth embodiment of the present invention.

FIG. 11 shows a flowchart of a tenth embodiment, in which the way of determining the TEOeco at step S800 in the eighth embodiment (FIG. 9) is modified.

That is, in the eighth embodiment, the target evaporator outlet air temperature TEO is changed to TEOeco that is higher than TEOon of the engine operating period by a predetermined amount. On the other hand, in the tenth embodiment, as shown in a map at step S800 of FIG. 11, in a process of determining TEOeco, as the target air flow level BLW becomes higher, that is, the power consumption of the blower 7 becomes larger or the motor operating period for driving the compressor 1 becomes longer, TEOeco is set to be higher.

The power consumption of the blower 7 and the power consumption of the motor 21 that drives the compressor 1 are accounted for a majority of power consumption during the non-operating period of the engine. Thus, the amount of remaining charge in the battery 50 may be estimated based on the target air flow level BLW, which is the information representing the power consumption of the blower 7, and a motor operating period, which is the information representing the power consumption of the motor 21 that drives the compressor 1.

As a result, in the tenth embodiment, it is assumed that as the power consumption of the blower 7 becomes larger or the motor operating period of the compressor 1 becomes longer, the amount of remaining charge in the battery 50 is further reduced. Furthermore, as the amount of remaining charge in the battery 50 is further reduced, the TEOeco is adjusted to a higher temperature. In this way, based on the amount of charge remaining in the battery 50, the compressor 1 can be driven with the smaller power to achieve the power saving.

As described above, in accordance with the tenth embodiment, by estimating the amount of remaining charge in the battery 50, it is possible to predict the incidence of the critical condition (large power-consuming condition) where the power of the battery 50 is consumed within a short period of time, and therefore the engine 20 needs to be restarted (this is the case in the first to ninth embodiments). Under the large power-consuming condition, the air conditioning is controlled in a manner that reduces the fuel consumption during the non-operating period of the engine (non-running period of the vehicle) based on the prediction (more specifically, TEO is changed to the higher temperature level), so that it is possible to avoid the short cycle of the engine stall and engine restart.

Furthermore, at step S1210, by the control for achieving the gradual change of TEO during the non-operating period of the engine, that is, by the provision of the appropriate upper limit for the rate of change of TEO (e.g., about 1 degree Celsius per minute), the minimum level of the passenger's feeling of comfort is ensured.

(Eleventh Embodiment)

Figure 12:
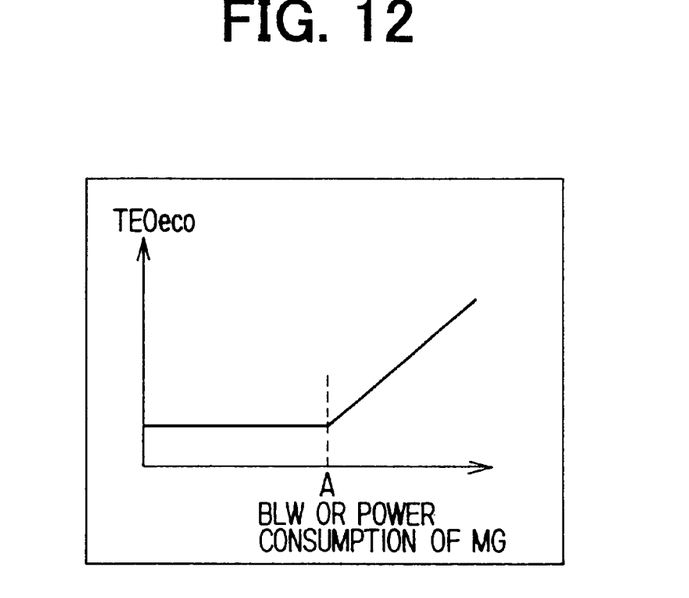
FIG. 12 is a characteristic control diagram of the eleventh embodiment of the present invention.

FIG. 12 shows an eleventh embodiment, in which step S800 of the tenth embodiment is modified. That is, in the eleventh embodiment, the target air flow level BLW or the power consumption of the motor 21 is measured after a predetermined time (e.g., one second) from the time of engine stall. TEOeco is determined from a map shown in FIG. 12 based on the measured target air flow level BLW or the measured power consumption of the motor 21. Like the previous embodiment, in the map shown in FIG. 12, as the target air flow level BLW or the measured power consumption of the motor 21 exceeds the predetermined value A, it is assumed that the amount of remaining charge in the battery 50 is lower than or equal to the predetermined value, so that TEOeco is adjusted to a higher temperature. In this manner, the eleventh embodiment provides the advantages similar to that of the tenth embodiment.

(Twelfth Embodiment)

Figure 13:
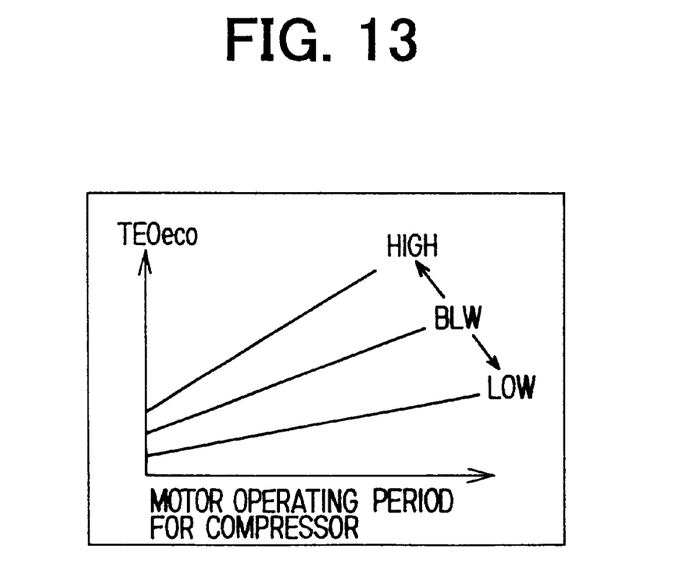
FIG. 13 is a characteristic control diagram of the present invention.

FIG. 13 shows a twelfth embodiment, in which step S800 of the tenth embodiment is modified. That is, in the twelfth embodiment, a map for extending the motor operating period and for adjusting TEOeco to a higher temperature is provided for each target air flow level BLW.

In the tenth through twelfth embodiments, the amount of remaining charge in the battery 50 is estimated based on the target air flow level BLW, which is the information representing the power consumption of the blower 7, and a motor operating period, which is the information representing the power consumption of the motor 21 that drives the compressor 1. However, if appropriate measuring means for directly measuring the amount of remaining charge in the battery 50 or other appropriate estimating means for estimating the amount of remaining charge in the battery 50 is provided in the vehicle, the map for determining TEOeco can be prepared using the measuring means or the estimating means.

(Other Embodiment)

In the described embodiments, the variable displacement compressor is used as the compressor 1, and the displacement of the compressor 1 is adjusted to make the actual evaporator outlet air temperature Te to coincide with the target value TEO. Alternatively, a general fixed displacement compressor can be used as the compressor 1. The fixed displacement compressor 1 may be turned on and off by engaging and disengaging an electromagnetic clutch 25 to vary a utilization rate of the compressor 1 in a manner that makes the actual evaporator outlet air temperature Te to coincide with the target value TEO.

Furthermore, in the first embodiment shown in FIG. 2, the necessity of the dehumidifying operation (de-misting operation) for defogging the window glass is determined based on the outside air temperature Tam, the amount of solar radiation Ts and the blow mode. Alternatively, a signal indicating the window glass temperature, a signal indicating the interior humidity of the vehicle, a signal indicating a vehicle speed, a signal indicating the activation of window wipers or any combination thereof may be used to determine the necessity of the dehumidifying operation.

Furthermore, in the described embodiments, the motor 21 that can also act as the generator is used as the drive source of the compressor 1. Alternatively, the motor 21 may be used as a dedicated drive source for driving the auxiliary devices, such as the compressor 1, and a separate generator may be additionally provided. Also, in the described embodiments, although the compressor 1 is separated from the drive motor 21, the compressor 1 may be integrally formed with the drive motor 21. That is, any type of the compressor drive mechanism can be used as long as the compressor drive mechanism allows the compressor 1 to be driven by the engine 20 during the operating period of the engine 20 and also allows the compressor 1 to be driven by the motor 21 during the non-operating period of the engine 20. Therefore, the interconnections among the compressor 1, the vehicle engine 20, the motor 21 and the generator may be modified in various ways.

Furthermore, in FIG. 1, the output signals for engaging and disengaging the electromagnetic clutch 25 of the compressor 1 are outputted from the engine control unit 30. Alternatively, the output signals for engaging and disengaging the electromagnetic clutch 25 of the compressor 1 may be outputted from the air conditioning control unit 32.

Furthermore, the engine control unit 30, the motor control unit 31 and the air-conditioning control unit 32, which are shown as separate units in FIG. 1, may be integrated into one unit.

While the above-described embodiments refer to examples of usage of the present invention, it is understood that the present invention may be applied to other usage, modifications and variations of the same, and is not limited to the disclosure provided herein.

What is claimed is:

1. A vehicle air conditioning system having a compressor arranged in a refrigeration cycle, wherein a drive source of said compressor is selectively changed between a vehicle engine and a motor depending on a running condition of a vehicle, said vehicle air conditioning system comprising:

a blower for blowing air toward an interior of said vehicle; and an evaporator arranged in said refrigeration cycle for cooling said air blown from said blower;

wherein at least a blower capacity or a compressor capacity is reduced while said compressor is driven by said motor relative to a respective blower capacity or compressor capacity while said compressor is driven by said vehicle engine; and wherein said compressor capacity is first reduced prior to reducing said blower capacity while a cooling heat load of said evaporator is greater than a predetermined value.

2. A vehicle air conditioning system according to claim 1, wherein both said blower capacity and said compressor capacity are reduced while said cooling heat load of said evaporator is lower than said predetermined value, whereby a window glass of said vehicle is not fogged.

3. A vehicle air conditioning system according to claim 2, wherein said compressor capacity is adjusted to cool said evaporator to coincide with a target value; and wherein said compressor capacity is reduced by adjusting said target value to a higher temperature.

4. A vehicle air conditioning system according to claim 2, wherein said cooling heat load of said evaporator is determined based on an outside air temperature of said vehicle.

5. A vehicle air conditioning system according to claim 1, wherein said compressor capacity is adjusted to cool said evaporator to coincide with a target value; and wherein said compressor capacity is reduced by adjusting said target to a higher temperature.

6. A vehicle air conditioning system according to claim 5, wherein said cooling heat load of said evaporator is determined based on an outside air temperature of said vehicle.

7. A vehicle air conditioning system according to claim 1, wherein said cooling heat load of said evaporator is determined based on an outside air temperature of said vehicle.

8. A vehicle air conditioning system having a compressor arranged in a refrigeration cycle, wherein a drive source of said compressor is selectively changed between a vehicle engine and a motor depending on a running condition of a vehicle, said vehicle air conditioning system comprising:

a blower for blowing air toward an interior of said vehicle; and an evaporator arranged in said refrigeration cycle for cooling said air blown from said blower;

wherein at least a blower capacity or a compressor capacity is reduced while said compressor is driven by said motor relative to a respective blower capacity or compressor capacity while said compressor is driven by said vehicle engine; and wherein said blower capacity is first reduced prior to reducing said compressor capacity if a window glass of said vehicle is being fogged while said compressor is driven by said motor.

9. A vehicle air conditioning system according to claim 8, wherein the existence of fogging is determined based at least on an outside air temperature of said vehicle.

10. A vehicle air conditioning system according to claim 9, wherein said blower capacity is not reduced it is determined that said window glass of said vehicle is being fogged when a blow mode is set to provide directional air toward said window glass of said vehicle.

11. A vehicle air conditioning system according to claim 8, wherein said blower capacity is not reduced it is determined that said window glass of said vehicle is being fogged when a blow mode is set to provide directional air toward said window glass of said vehicle.

12. A vehicle air conditioning system having a compressor arranged in a refrigeration cycle, wherein a drive source of said compressor is selectively changed between a vehicle engine and a motor depending on a running condition of a vehicle, said vehicle air conditioning system comprising:

means for gradually changing said compressor capacity;

wherein a rate of gradual change of compressor capacity while said compressor is driven by said motor is greater than a rate of change of said compressor capacity when said compressor is driven by said vehicle engine.

13. A vehicle air conditioning system according to claim 12, wherein:

said compressor capacity is adjusted to cool said evaporator to coincide with a target value; and wherein a rate of change of said target value while said compressor is driven by said motor is increased relative to said rate of change of said target value when said compressor is driven by said vehicle engine.

14. A vehicle air conditioning system according to claim 13, wherein said compressor is a variable displacement compressor; and wherein said compressor capacity is changed by changing a displacement of said variable displacement compressor.

15. A vehicle air conditioning system according to claim 12;

wherein said compressor is a variable displacement compressor; and wherein said compressor capacity is changed by changing a displacement of said variable displacement compressor.

16. A vehicle air conditioning system according to claim 15, further comprising a computing means for computing a control output value, said computing means determining said displacement of said compressor based on a deviation between an actual degree of coolness of said evaporator and said target value;

wherein a rate of change of said control output value computed by said computing means relative to said deviation while said compressor is driven by said motor is increased relative to said rate of change of said control output value computed by said computing means relative to said deviation while said compressor is driven by said vehicle engine.

17. A vehicle air conditioning system having a compressor arranged in a refrigeration cycle, wherein a drive source of said compressor is selectively changed between a vehicle engine and a motor depending on a running condition of a vehicle, said vehicle air conditioning system comprising:

means for gradually changing a capacity of a blower for blowing air toward an interior of said vehicle, wherein a rate of gradual change of said blower capacity while said compressor is driven by said motor is increased relative to said rate of gradual change of said blower capacity while said compressor is driven by said vehicle engine.

18. A vehicle air conditioning system having a compressor arranged in a refrigeration cycle, wherein a drive source of said compressor is selectively changed between a vehicle engine and a motor depending on a running condition of a vehicle, said vehicle air conditioning system comprising:

a blower for blowing air toward an interior of said vehicle; and an evaporator arranged in said refrigeration cycle for cooling said air blown from said blower;

wherein at least a blower capacity or a compressor capacity is reduced while said compressor is driven by said motor relative to a respective blower capacity or compressor capacity while said compressor is driven by said vehicle engine; and wherein at least a degree of said reduction of said blower capacity and a degreee of said reduction of said compressor capacity is controlled based on an amount of remaining charge in a battery that provides power to said motor when said compressor is driven by said motor.

19. A vehicle air conditioning system according to claim 18, wherein:

said compressor capacity is adjusted to make an actual degree of coolness of said evaporator to coincide with a target value; and said target value is adjusted to a higher temperature while said amount of remaining charge in said battery becomes less than or equal to a predetermined value.

20. A vehicle air conditioning system according to claim 19, wherein said amount of remaining charge in said battery is estimated based at least on power consumption information of said motor or power consumption information of said blower.

21. A vehicle air conditioning system according to claim 19, wherein an amount of change in said target value when said target value being adjusted to said higher temperature is increased as said amount of remaining charge in said battery decreases.

22. A vehicle air conditioning system according to claim 21, wherein said amount of remaining charge in said battery is estimated based at least on power consumption information of said motor or power consumption information of said blower.

23. A vehicle air conditioning system according to claim 18, wherein said mount of remaining charge in said battery is estimated based at least on power consumption information of said motor or power consumption information of said blower.

* * * * *